Nov. 13, 1951            W. M. HARCOURT            2,575,270
PROCESS FOR THE MANUFACTURE OF COMPOSITE
PHOTOGRAPHIC OR CINEMATOGRAPHIC PICTURES
Filed April 14, 1948            2 SHEETS—SHEET 1

Inventor
William Michael Harcourt
By Wilfred E. Lawson
Attorney

Nov. 13, 1951  W. M. HARCOURT  2,575,270
PROCESS FOR THE MANUFACTURE OF COMPOSITE
PHOTOGRAPHIC OR CINEMATOGRAPHIC PICTURES
Filed April 14, 1948  2 SHEETS—SHEET 2

Inventor
William Michael Harcourt
By
Wilfred E. Lawson
Attorney

Patented Nov. 13, 1951

2,575,270

UNITED STATES PATENT OFFICE 2,575,270

PROCESS FOR THE MANUFACTURE OF COMPOSITE PHOTOGRAPHIC OR CINEMATOGRAPHIC PICTURES

William Michael Harcourt, Gerrards Cross, England, assignor to Denham Laboratories Limited, Denham, Uxbridge, England, a British company Application April 14, 1948, Serial No. 21,064
In Great Britain April 15, 1947

4 Claims. (Cl. 88—16)

This invention relates to an improved process for the manufacture of composite photographic or cinematographic pictures. In making composite pictures photographically wherein a photograph of one subject viewed at more or less short range is superimposed upon a view of some background, it is known to photograph the object and the background separately, and to combine the two pictures in a photo-printing operation by utilising in addition to the negatives of the foreground object and the background respectively, masks or mattes bearing opaque areas whose outlines conform to the areas occupied by the two parts, i. e., foreground object and background respectively comprised in the picture. The printing of the composite picture is performed in two stages in one of which the image of the background is printed through a mask or matte protecting the area to be occupied by the foreground object while in the other image of the foreground object is printed through a mask which protects the background part of the composite picture.

It has already been proposed to light a plain background and the object with contrasting illuminations and, by means of a beam-splitting device in the camera, to make simultaneous records on two films suitably selectively sensitised, one film recording the plain background and leaving clear film for the object, while the other film records the object with or without the plain background. A print of the former thus gives a silhouette of the object on clear film, and can be used as a mask or matte with any desired background to give a print which when once more printed, in register with the second of the two films, give a picture showing the object on the desired background.

The present invention has for its aim the application of these principles in an improved manner. A further aim is to extend their application to the production of coloured photographs. Other aims will appear from the following description.

These aims are achieved by the present invention according to which an object is photographed in front of a plain background, preferably blue in colour, which is strongly illuminated, the object being normally lighted at smaller intensity. The camera is provided with a beam-splitting device which divides the light received from object and background and directs it to two photographic films presented at separate gates so that each film receives its share of light from both object and background. The background illumination should be about five times the effective intensity of the foreground illumination, which may, for example, be 80–90 foot-candles.

The main (foreground) negative for monochrome photography is made on panchromatic film, the background negative on film highly sensitive to blue. For colour photography the main film is an integral tripack colour-sensitive film instead of the panchromatic film used for monochrome work.

By this means one film K is made to record a negative image of the object on an opaque background. The other film L, records an opaque background, with clear film for the object owing to the contrasting illumination. Since the background is strongly illuminated, film L will be fully exposed for the background but will be grossly underexposed for the object. The film K will be fully exposed for both object and background.

If the background is blue it may be illuminated with white light. A white background should be illuminated with blue light.

The background film L, on which the object is represented by clear film, gives by ordinary direct printing the desired matte or mask showing a silhouette of the object on a background of clear film. The further working up of this matte and the object film K and their marrying with an independent background may be effected in the known manner.

The present invention is hereinafter more fully described with reference to the accompanying drawings which illustrate diagrammatically certain features, in connection with this improved mode of producing composite pictures.

In these drawings—

Figure 1:
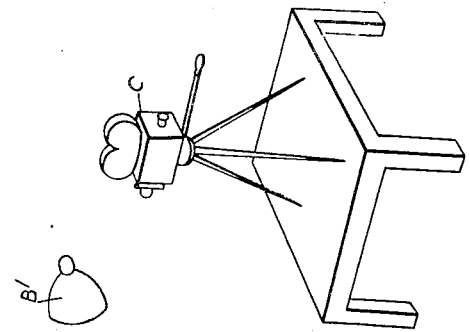
Figure 1 illustrates diagrammatically in perspective view a background, foreground objects and a camera set up for making a foreground negative and a background matte in one and the same operation.
Figure 1:
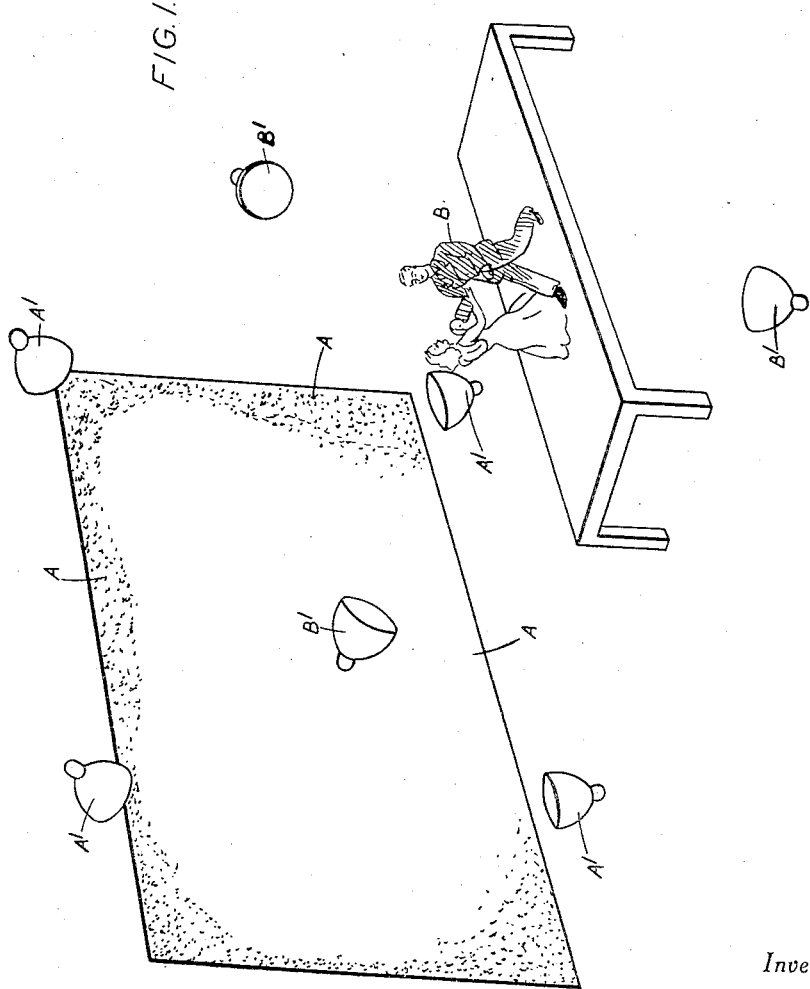

When making composite photographs in accordance with this invention the foreground objects to be superimposed upon any desired background are photographed in a studio before a plain background adapted to assist in the making of the matte or mask, and the foreground objects and the background are separately illuminated. Thus, Figure 1 illustrates schematically a suitable arrangement wherein A is a plain background illuminated as for example by lamps A[1]

while B indicates players or objects constituting the foreground matter for the purpose of this example, these being separately illuminated as by the lamps B¹. The camera by which the photograph of the foreground objects and the matte or mask are made simultaneously is indicated at C.

In order to operate the system successfully for monochrome, the main negative is made on a panchromatic film the emulsion of which can be in every respect the same as that used on production work to-day.

The photography is then carried out in the following manner: the foreground as B, Figure 1, it is proposed to marry together with an either existing or non-existing background, is placed before a plain background as A, Figure 1, which is either painted blue to a given density or may be white illuminated by blue light or ultra violet light of a given intensity projected on it by the lamps A¹, Figure 1. The foreground objects shown as B should be photographed from the front these being illuminated as by lamps B¹, with a key light of between 80 and 90 foot candles whilst the blue background A should receive approximately five times that amount of light.

Figure 2:
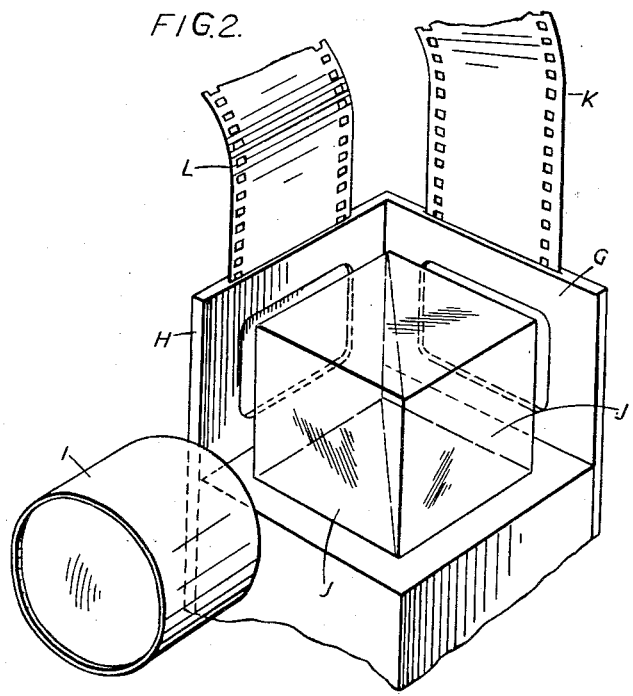
Figure 2 is a perspective view illustrating diagrammatically a beam splitting device and double film gate as used in accordance with this invention.

Figure 2 denotes schematically the arrangement wherein separate film gates G and H are provided and the optical beam coming from the lens I is split by a system of prisms denoted at J whereby separate but similar images may be directed on to the films contained in the gates G and H. In this arrangement the film K shown in gate G may be a bipack film or an integral tri-pack colour sensitive film while the film L in the gate H is one bearing an ordinary positive emulsion on which the travelling matte is to be made. In this case it might not be necessary to use the blue backing or the backing subjected to infrared radiations an ordinary white backing might be quite suitable.

With the foregoing method of producing a travelling matte, the producer or director need not make up his mind as to what background he would like to use until any time convenient to himself, or he could in fact try several backgrounds, as there would be no difficulty at all in the straightforward optical operation of superimposition. If the matter was of urgency, the complete shot with the foreground married to the background could be furnished one day after the original was shot. The speed with which this process can be operated is one of its chief assets, but far and away the most important is the possibility of obtaining a completely opaque matte which cuts out the tedious methods which were previously necessary in producing mattes by hand work.

I claim:

1. An improved process for making composite and cinematographic pictures which comprises separately illuminating foreground objects in front of a plain background, with the illumination of the background approximately five times that of the foreground objects, splitting the composite beam into two components and focusing the rays from the foreground objects and the background on each of two films presented simultaneously whereby after development there are obtained a main film recording foreground objects on the plain opaque background and a background film recording a plain opaque background with clear film for the foreground objects, the said two films having such sensitivities that the background film is correctly exposed in respect of the background and grossly underexposed in respect of the foreground objects, while the main film is correctly exposed in respect of the foreground objects.

2. The process as defined in claim 1, in which the main film is a bipack film and the background film is a blue sensitive film, and the background is illuminated with blue light.

3. The process as defined in claim 1, in which the main film is a bipack film and the background film is a blue sensitive film, and the background is a plain blue background.

4. The process as defined in claim 1, in which the main film is an integral tri-pack colour film.

WILLIAM MICHAEL HARCOURT.

REFERENCES CITED

The following references are of record in the file of this patent:

UNITED STATES PATENTS

| Number | Name | Date |
| --- | --- | --- |
| 1,840,669 | Handschiegl | Jan. 12, 1932 |
| 1,982,211 | Gillette | Nov. 27, 1934 |
| 2,024,081 | Williams | Dec. 10, 1935 |
| 2,204,049 | Planskoy | June 11, 1940 |
| 2,232,144 | Sersen | Feb. 18, 1941 |
| 2,297,553 | Harcus | Sept. 29, 1942 |
| 2,297,582 | Rackett | Sept. 29, 1942 |